Figure 1:
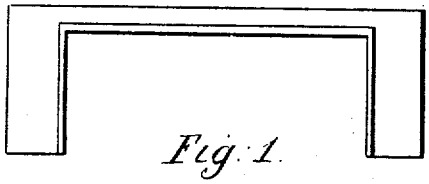
Figure 2:
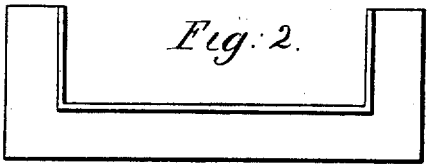
Figure 3:
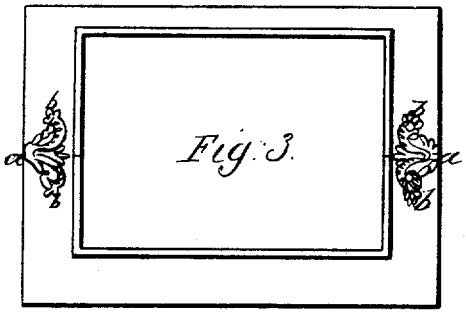
Figure 4:
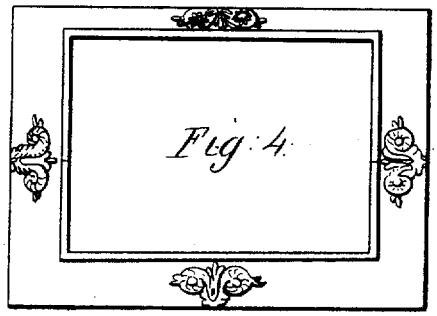

126 STOVES & FURNACES,
Stoves, Heating, Stove plates.

81

BEST AVAILABLE COPY

E. Nott.

Heating Stove.

No. 7,638 X

Patented Jun. 29, 1833.

K. PETERS, PHOTO-LITHOGRAPHER, WASHINGTON, D. C.

76388X June 29. 1833

Eliphalet Nott.

Case "4"

Letters Pattent.

The Schedule referred to in these Letters Patent, and making
part of the same, containing a description in the words of the said
Eliphalet Nott himself of his improvement; in the lining between which
and the front plate, the flue for the ascent of air from and descent
of ashes to the ashpit is formed in Anthracite coal stoves.

---

Case No 4

Specification of improvements made in the construction and adjust
-ment of the lower lining, that is the lining adjusted between the floor
of the chamber of combustion and the bottom of the vertical grate;
between which lining and the front plate the flue for the ascent of air
from, and the descent of ashes to the ashpit, is formed.
Whereas inconvenience has arisen from the warping of said lining, the same
being of iron, especially when the space to be occupied was of consider
-able horizontal extent, therefore an improvement having been intro-
duced and tested by repeated experiments is now deemed worthy of being
carried into general use, which improvement consists: In making
use of a separate moveable plate for said lining, in place of a connected
and fixed one. - And in case the space to be occupied is of considerable
horizontal extent, in making use of several separate sections, mea-
suring horizontally four or five inches each and adjusted edge to
edge about an eighth of an inch apart in the same vertical plane,
in place of one entire plate. - and in either case in keeping said lining
sufficiently apart from the front plate for the ascent of air and the de-
scent of ashes between the two; which may be effected by attaching
to the extremities of each section of lining employed, a vertical flange
interposing between the same and said front plate. - and if said flanges
be projected downward in the form of prongs or feet a little below the lower
margin of the sections to which they are respectively attached, and [illegible]
in in the aperture opened through the chamber of combustion, for the flue, they will furnish the only fixture requisite for confining the same in place. For further information reference must be had to the drawings hereunto appended.

Summary.

The improvement herein contemplated consists, in preventing the warping and facilitating the removal, of the lining between which and the front plate, the flue for ascent of air and the descent of ashes, is formed, by making use of a moveable, in place of a fixed plate in the construction of said lining_ and when the flue to be formed is more than four or five inches in horizontal extent, by making use of sever-al separate sections of plate as aforesaid in place of one entire plate in the formation of the same._ and in combining said lining whether entire or in sections with a vertical front grate and its exterior sash for mica with a flue between the two as already in use in coal stoves. I therefore claim as my invention & improvement the preventing of the warping and the facilitating of the removal of the lining aforesaid by the making use of a moveable, in place of a fixed plate therefor; and that whether the same consist of one entire plate or several separate sections; and the combination thereof with the vertical front grate and its exterior sash for mica with a flue between the two as aforesaid; together with the uses to which the same has been or may hereafter be applied, in stoves or furnaces.

Exd. Witnesses Eliphalet Nott.
[illegible] D. Boyd
G. T. Yates (676 words)

(Granted June 29. 1833)
( D. in Portfolio)